United States Patent
Lytkin et al.

(10) Patent No.: US 10,187,493 B1
(45) Date of Patent: Jan. 22, 2019

(54) COLLECTING TRAINING DATA USING SESSION-LEVEL RANDOMIZATION IN AN ON-LINE SOCIAL NETWORK

(71) Applicant: Microsoft Technology Licensing, LLC, Redmond, WA (US)

(72) Inventors: Nikita Igorevych Lytkin, Sunnyvale, CA (US); Ying Xuan, Sunnyvale, CA (US); Guy Lebanon, Menlo Park, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 96 days.

(21) Appl. No.: 15/188,650

(22) Filed: Jun. 21, 2016

(51) Int. Cl.
*H04L 29/08* (2006.01)
*G06F 17/30* (2006.01)
*G06Q 50/00* (2012.01)

(52) U.S. Cl.
CPC ...... *H04L 67/327* (2013.01); *G06F 17/30554* (2013.01); *G06F 17/30867* (2013.01); *H04L 67/02* (2013.01); *H04L 67/142* (2013.01); *H04L 67/306* (2013.01); *G06Q 50/01* (2013.01)

(58) Field of Classification Search
CPC .............................. H04L 51/32; G06Q 50/01
See application file for complete search history.

(56) References Cited

U.S. PATENT DOCUMENTS

| | | | | |
|---|---|---|---|---|
| 7,669,123 B2 * | 2/2010 | Zuckerberg | ....... | G06F 17/30867 715/273 |
| 8,171,128 B2 * | 5/2012 | Zuckerberg | ............ | G06Q 30/02 707/702 |
| 8,930,819 B1 * | 1/2015 | Chan | ........................ | H04L 67/10 715/736 |
| 8,935,339 B2 * | 1/2015 | Cheng | ..................... | H04L 51/24 709/206 |
| 9,137,086 B1 * | 9/2015 | Naik | .................... | H04L 29/0602 |
| 9,667,731 B2 * | 5/2017 | Tetreault | ............ | H04N 21/2187 |
| 9,679,314 B1 * | 6/2017 | Wang | ................. | G06Q 30/0273 |
| 9,680,959 B2 * | 6/2017 | Gargi | ................. | G06Q 30/0269 |
| 9,762,629 B1 * | 9/2017 | Bhargava | ............... | G06Q 50/01 |
| 10,083,454 B2 * | 9/2018 | Hartman | ........... | G06F 17/30867 |
| 2009/0100046 A1 * | 4/2009 | Huck | ................ | G06F 17/30041 |
| 2009/0248602 A1 * | 10/2009 | Frazier | .............. | G06F 17/30035 706/46 |
| 2010/0205541 A1 * | 8/2010 | Rapaport | ............... | G06Q 10/10 715/753 |
| 2011/0264663 A1 * | 10/2011 | Verkasalo | ......... | G06F 17/30867 707/740 |

(Continued)

*Primary Examiner* — Lashonda T Jacobs
(74) *Attorney, Agent, or Firm* — Schwegman Lundberg & Woessner, P.A.

(57) ABSTRACT

A news feed system of an on-line social network system news utilizes a relevance model to determine which updates from an inventory of updates are to be presented to a member on their news feed page. The relevance model is trained using historical data that reflects interactions of members of the on-line social network system with items in their respective news feed pages. In order to reduce potential biases in the historical data that is used to train the relevance model, the news feed system designates a certain portion of all member sessions to be random sessions. The news feed generated for a member during a random session includes updates that are selected and/or ordered for presentation using one or more randomization techniques.

20 Claims, 4 Drawing Sheets

(56) References Cited

U.S. PATENT DOCUMENTS

| | | | | |
|---|---|---|---|---|
| 2013/0031034 A1* | 1/2013 | Gubin | G06Q 10/06393 | 706/12 |
| 2013/0304822 A1* | 11/2013 | Tetreault | H04N 21/2187 | 709/204 |
| 2014/0040370 A1* | 2/2014 | Buhr | H04L 67/306 | 709/204 |
| 2015/0081449 A1* | 3/2015 | Ge | G06F 17/30867 | 705/14.66 |
| 2015/0149649 A1* | 5/2015 | Hughes | H04L 65/1069 | 709/228 |
| 2016/0042069 A1* | 2/2016 | Lee-Goldman | G06F 17/30864 | 707/706 |
| 2016/0062621 A1* | 3/2016 | Delacroix | G06Q 30/0641 | 715/771 |
| 2016/0188725 A1* | 6/2016 | Wang | G06F 17/30867 | 707/734 |
| 2016/0224559 A1* | 8/2016 | Hicks | G06F 17/30554 | |
| 2017/0351675 A1* | 12/2017 | Marra | G06F 17/30867 | |

\* cited by examiner

COLLECTING TRAINING DATA USING SESSION-LEVEL RANDOMIZATION IN AN ON-LINE SOCIAL NETWORK

TECHNICAL FIELD

This application relates to the technical fields of software and/or hardware technology and, in one example embodiment, to system and method to collect training data using session-level randomization in an on-line social network.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be include one or more web pages, or a structured representation of the member's information in XML (Extensible Markup Language), JSON (JavaScript Object Notation), etc. A member's profile web page of a social networking web site may emphasize employment history and education of the associated member.

A member of on-line social network may be permitted to share information with other members by posting an update that would appear on respective news feed pages of the other members. An update may be an original message, a link to an on-line publication, a re-share of a post by another member, etc. Members that are presented with such an update on their news feed page may choose to indicate that they like the post, may be permitted to contribute a comment, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
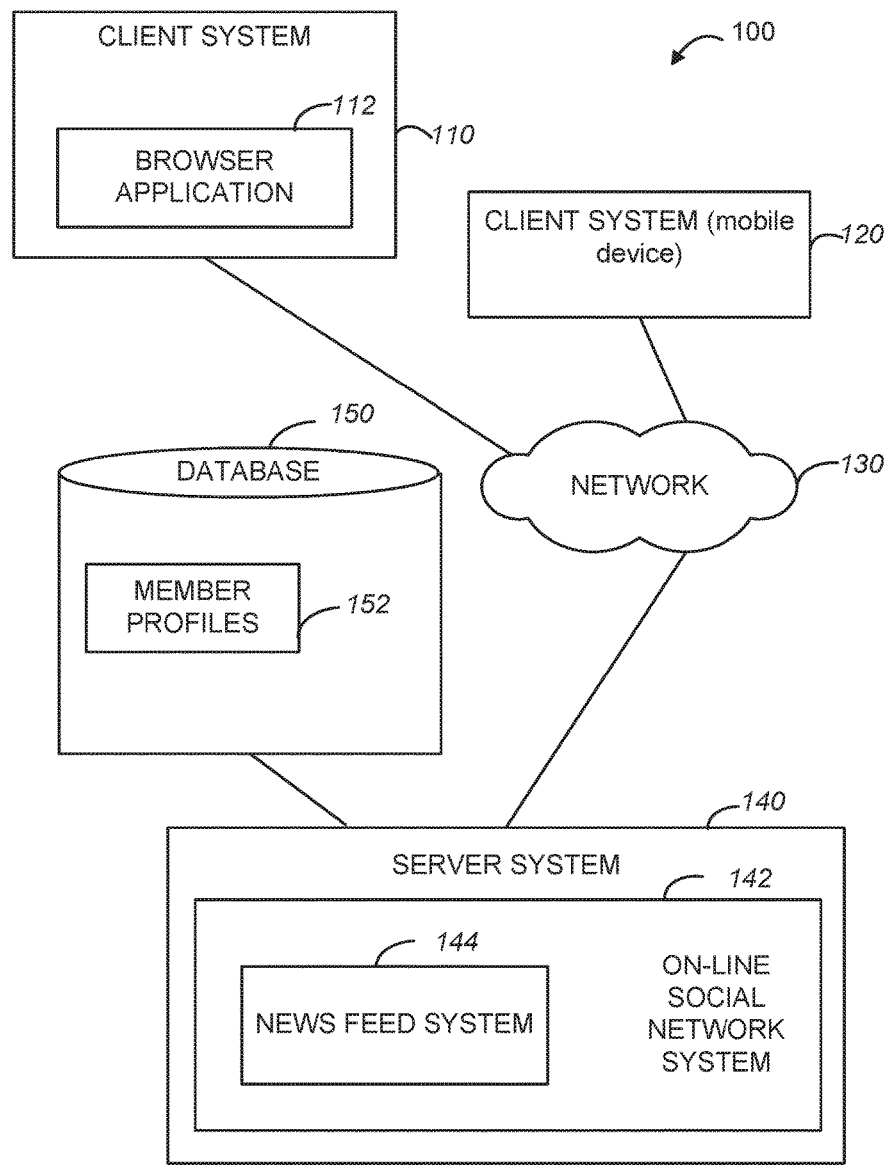
FIG. 1 is a diagrammatic representation of a network environment within which an example method and system to collect training data using session-level randomization in an on-line social network may be implemented.

A method and system to collect training data using session-level randomization in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile of a member may also include information about the member's current and past employment, such as company identifications, professional titles held by the associated member at the respective companies, as well as the member's dates of employment at those companies. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network. The on-line social network system, in some embodiments, also permits a one-sided connection, where a member is permitted to follow another member or another entity, such as a company, a university, etc. When a member follows another member or entity, that member's profile is associated with a link indicative of a one-sided connection, where, e.g., the member receives updates regarding the other member or the entity that the member follows.

An update, for the purposes of this description, is an information item for presentation to one or more members represented by respective member profiles in the on-line social network system. The updates may be presented as part of the member's so-called news feed. A news feed may be provided to a member on a dedicated web page, e.g., on a home page of the member in the on-line social network. A news feed page is generated for each member by a news feed system provided with the on-line social network system and includes items that has been determined as being potentially of interest to that member. Examples of items in the news feed generated for a member are posts and news with respect to the connections of that member and the entities that the member is following, as well as job postings that have been determined as relevant to the member. As there may be a rather large inventory of updates available for inclusion into a member's news feed, the news feed system includes a ranking module configured to select a subset of all available updates for inclusion into the news feed. Such selection maybe based on various selection criteria, such as, e.g., the degree of relevance of an update item with respect to the member, the degree of connection between the member and the source of the update, etc. A member for whom a news feed is being generated is referred, for the purposes of this description, a focus member, and the profile representing the focus member in the on-line social network system is referred to as a focus profile.

The ranking module employs a statistical model (referred to as the relevance model for the purposes of this description) to process the inventory of updates for the focus member in order to select a subset of updates for presentation to the focus member via a news feed web page. The final set of updates is then included in the news feed web page that is being generated for the focus member. For example, in one embodiment, the ranking module ranks the items in the inventory of updates utilizing, logistic regression. The ranking module takes, as input, the attributes characterizing respective updates and the attributes characterizing the focus member. Such attributes may include the type of the item (e.g., job recommendation, connection recommendation, news article share, etc.), focus member's past counts of interactions with items of this type, profile attributes of the focus member (e.g., skills, industry, education, etc.), as well as profile attributes of the member whose activity resulted in generation of this item (e.g., member article share), etc. The ranking module is trained on demand or on a periodic basis using various types of training data, such as, e.g., historical data reflecting members' interactions with updates.

The news feed module collects historical data reflecting members' interactions with updates by detecting a login session initiated for a member in the on-line social network system and, in response, commencing monitoring and storing events data originated with the member with respect to the news feed generated for and presented to the member. Historical data reflecting members' interactions with updates data represents, e.g., views of news feed items, shares, comments, etc.

A login session may be referred to as a member session or merely a session for the purposes of this description. In some embodiments, in order to reduce potential biases in the historical data that is used to train the relevance model, the news feed system collects historical data reflecting members' interactions with updates during regular sessions and also during so-called random sessions. A random session is a login session during which a member is presented with a news feed generated using a random ordering or top-ranked updates or applying a perturbation to the ranking scores generated by the relevance model. A random session is a login session during which a member is presented with a feed generated using a random ordering or top-ranked updates or applying a perturbation to the ranking scores generated by the relevance model. A regular session, on the other hand, is a login session during which a member is presented with a feed generated using a pre-determined ordering or top-ranked updates, based on non-perturbed ranking scores generated by the relevance model.

The news feed system is configured to designate a certain portion of all member sessions to be random sessions. In one embodiment, a when a new login session is being requested, the session is selected to be a random session randomly but with a bias that preserves a predetermined randomization rate (e.g., 5% of all sessions are random sessions). Randomization rate is the probability with which a login session is designated to be a random session. Randomization rate can be changed dynamically, e.g., based on various factors, such as, e.g., session requests history feature associated with the member requesting a login session with the on-line social network system. For example, the randomization rate may be decreased based on how recently the member requested a login session how frequently the member visits the web site provided by the on-line social network system, how recently a session for that member has been selected to be a random session, etc. When the randomization rate for a requested session is reduced as compared to a default randomization rate and the requested session is selected to be a random session, the observations collected with respect to member interaction with their feed during the random session are weighted up when used as training data, in order to counteract the reduction of the randomization rate. Example method and system to collect training data using session-level randomization in an on-line social network may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a news feed system 144 that may be utilized beneficially to generated news feed for members. The news feed system 144 may be configured to designate a certain portion of all member sessions to be random sessions. The news feed generated for a member during a random session includes updates that are selected and/or ordered for presentation using one or more randomization techniques, as described above. An example news feed system 144 is illustrated in FIG. 2.

Figure 2:
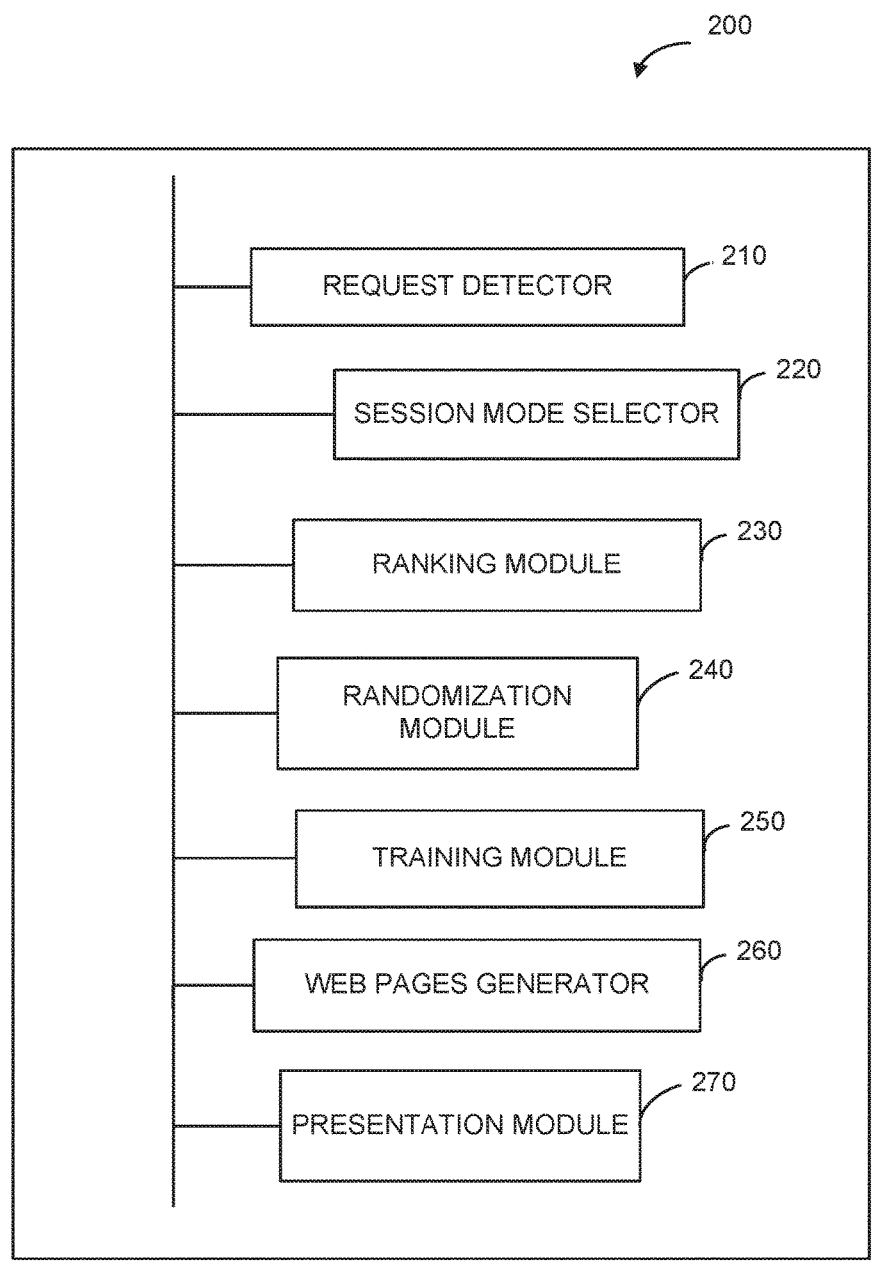
FIG. 2 is block diagram of a system to collect training data using session-level randomization in an on-line social network, in accordance with one example embodiment.

FIG. 2 is a block diagram of a system 200 to collect training data using session-level randomization in an on-line social network, in accordance with one example embodiment. As shown in FIG. 2, the system 200 includes a request detector 210, a session mode selector 220, a ranking module 230, a randomization module 240, and a training module 250. The request detector 210 is configured to detect a request to commence a login session for a member represented by a member profile in the on-line social network system 142 of FIG. 1. The request may originate from the client system 110 or the client system 120 of FIG. 1. The session mode selector 220 is configured to generate, randomly with a predetermined probability, a session mode value. The session mode value indicates whether a login session is to be a random session or a regular session. The ranking module 230 is configured to invoke a relevance model to generate respective scores for items in an inventory of updates identified as potentially of interest to the member who has requested a login session. The randomization module 240 is configured to randomize presentation of items to be included in a news feed web page based on the generated session mode value indicating that the requested login session is to be a random session. The training module 250 is configured to train the relevance model using data representing interactions of the member with items presented in the news feed during the random session.

Also shown in FIG. 2 is a web pages generator 260 and a presentation module 270. The web pages generator 260 is configured to generate, during a random session, a news feed web page using the presentation of items randomized by the randomization module 240. As explained above, a randomized presentation of items in the news feed may be achieved by, e.g. using a random ordering or top-ranked updates or applying a perturbation to the ranking scores generated by the relevance model. For example, in one embodiment, the web pages generator 260 includes a predetermined number of top-scored items from the inventory of updates into a presentation set of items to be included in the news feed web page in a random order. The top-scoring items are determined based on the respective scores generated by the ranking module 230 for the items in the inventory of updates. The web pages generator 260 is configured to generate, during a regular session, a news feed web page using the presentation of items in an order determined based on the items' respective scores generated by the ranking module 230. The presentation module 270 is configured to cause presentation of the news feed web page on a display device of the member. Some operations performed by the system 200 may be described with reference to FIG. 3.

Figure 3:
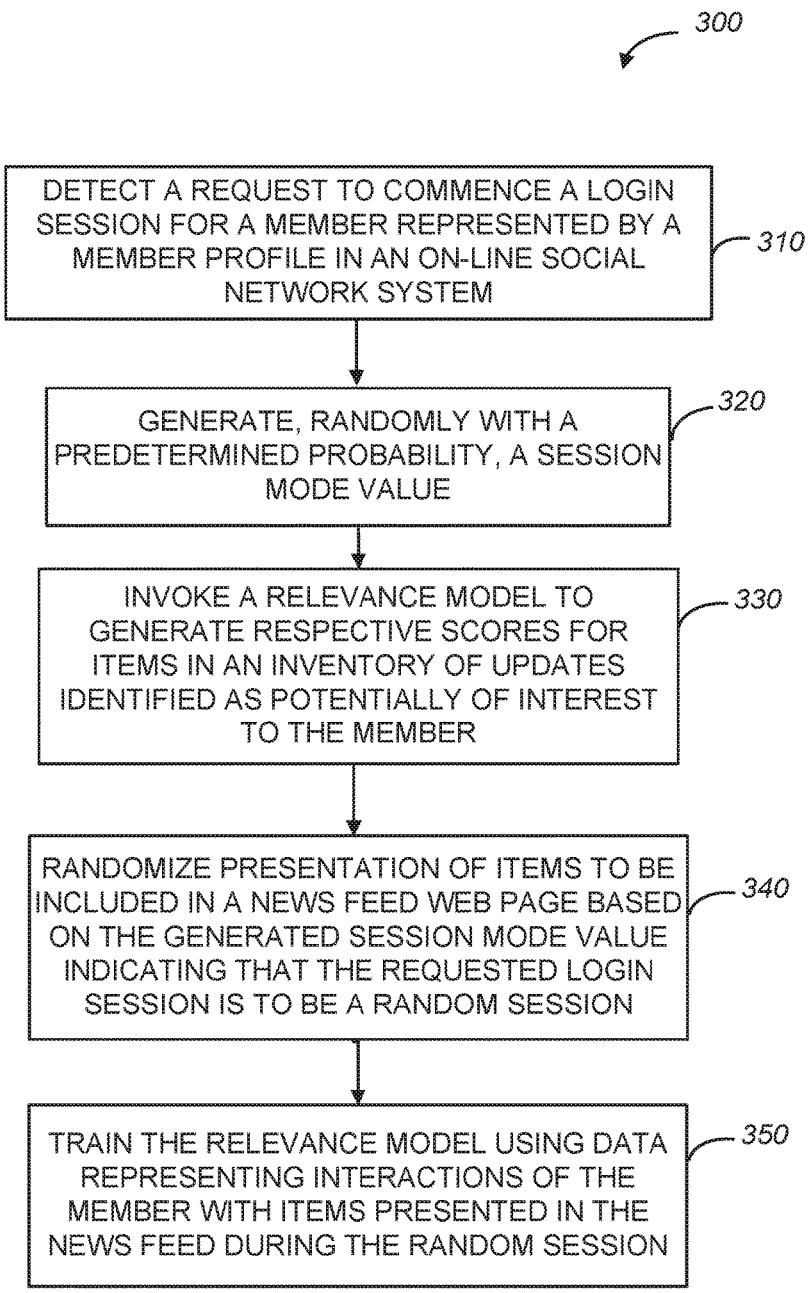
FIG. 3 is a flow chart of a method to collect training data using session-level randomization in an on-line social network, in accordance with an example embodiment.

FIG. 3 is a flow chart of a method 300 to collect training data using session-level randomization in an on-line social network for a member, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the request detector 210 of FIG. 2 detects a request to commence a login session for a member represented by a member profile in the on-line social network system 142 of FIG. 1. At operation 320, the session mode selector 220 of FIG. 2 generates, randomly with a predetermined probability, a session mode value. The session mode value indicates whether a login session is to be a random session or a regular session. The ranking module 230 of FIG. 2 invokes a relevance model to generate respective scores for items in an inventory of updates identified as potentially of interest to the member who has requested a login session, at operation 330. At operation 340, the randomization module 240 of FIG. 2 randomizes presentation of items to be included in a news feed web page based on the generated session mode value indicating that the requested login session is to be a random session. At operation 350, the training module 250 of FIG. 2 trains the relevance model using data representing interactions of the member with items presented in The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
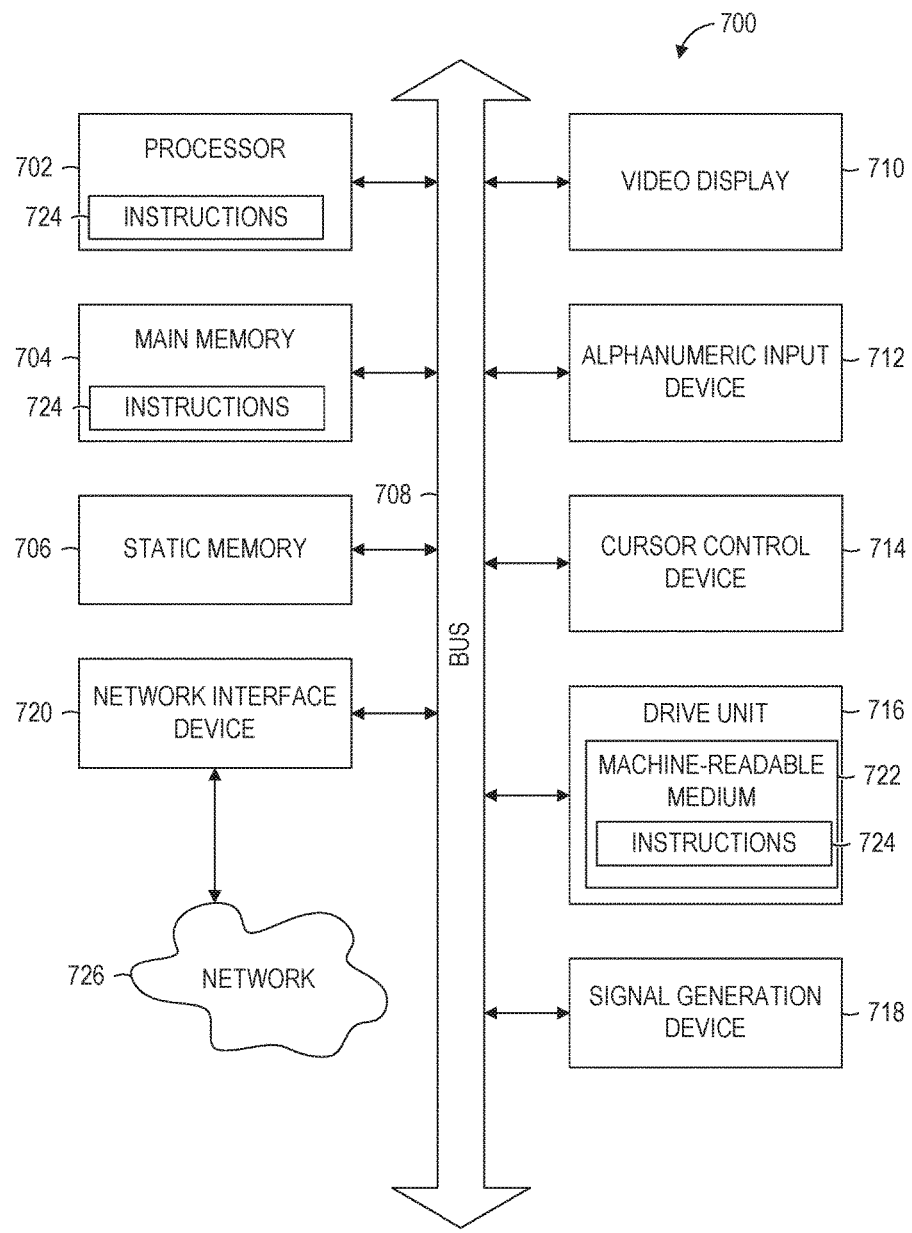
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system to collect training data using session-level randomization in an on-line social network have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
   detecting, at a server system, a request to commence a login session for a member represented by a member profile in an on-line social network system;
   generating, randomly with a predetermined probability, a session mode value;
   invoking a relevance model to generate respective scores for items in an inventory of updates identified as potentially of interest to the member, the respective relevance scores utilized to determine ordering of updates from the inventory of updates on a news feed web page generated for the member;
   using at least one processor, randomizing the order of presentation of items to be included in the news feed web page based on the generated session mode value indicating that the requested login session is to be a random session, the news feed page to be displayed on a display device of the member; and
   training the relevance model using data representing interactions of the member with items presented in the news feed during the random session.

2. The method of claim 1, comprising including a predetermined number of top-scored items from the inventory of updates into a presentation set of items, wherein the randomizing of the presentation of items to be included in the news feed web page comprises including items from the presentation set of items in the news feed web page in a random order.

3. The method of claim 1, wherein the randomizing of the presentation of items to be included in the news feed web page comprises perturbing the generated scores by a random factor and using the resulting perturbed scores to select the items to be included in the news feed web page.

4. The method of claim 1, wherein the predetermined probability used by the session mode selector to generate a session mode value indicating that the requested login session is to be a random session is a default probability.

5. The method of claim 4, comprising:
   detecting a further request to commence a further login session for a further member represented by a further member profile in the on-line social network system; and
   based on a session requests history feature associated with the further member profile; utilizing probability other than the default probability to generate a session mode value for the further login session.

6. The method of claim 5, comprising utilizing probability that is less than the default probability.

7. The method of claim 5, wherein the session requests history feature reflects how recently a login session initiated for the further member was selected to be a random session.

8. The method of claim 5, wherein the session requests history feature reflects how frequently login sessions are initiated for the further member.

9. The method of claim 5, comprising training the relevance model using weighted data representing interactions of the member with items presented in the news teed during the random session.

10. The method of claim 1, comprising:
    constructing a news feed web page that includes the subset of items from the inventory; and
    causing presentation of the news feed web page on a display device of the member.

11. A computer-implemented system comprising:
    one or more processors; and
    a non-transitory computer readable storage medium comprising instructions that when executed by the one or processors cause the one or more processors to perform operations comprising:
    detecting, at a server system, a request to commence a login session for a member represented by a member profile in an on-line social network system;
    generating, randomly with a predetermined probability, a session mode value;
    invoking a relevance model to generate respective scores for items in an inventory of updates identified as potentially of interest to the member, the respective relevance scores utilized to determine ordering of updates from the inventory of updates on a news feed web page generated for the member;
    randomizing the order of presentation of items to be included in the news feed web page based on the generated session mode value indicating that the requested login session is to be a random session, the news feed page to be displayed on a display device of the member; and
    training the relevance model using data representing interactions of the member with items presented in the news feed during the random session.

12. The system of claim 11, comprising including a predetermined number of top-scored items from the inventory of updates into a presentation set of items, wherein the randomizing of the presentation of items to be included in the news feed web page comprises including items from the presentation set of items in the news feed web page in a random order.

13. The system of claim 11, comprising perturbing the generated scores by a random factor and using the resulting perturbed scores to select the items to be included in the news feed web page.

14. The system of claim 11, wherein the predetermined probability is a default probability.

15. The system of claim 14, comprising:
    the request detector is to detect a further request to commence commencing a further login session for a further member represented by a further member profile in the on-line social network system; and
    utilizing probability other than the default probability to generate a session mode value for the further login session, based on a session requests history feature associated with the further member profile.

16. The system of claim 15, comprising utilizing probability that is less than the default probability.

17. The system of claim 15, wherein the session requests history feature reflects how recently a login session initiated for the further member was selected to be a random session.

18. The system of claim 15, wherein the session requests history feature reflects how frequently login sessions are initiated for the further member.

19. The system of claim 15, wherein the training of the relevance model comprises using weighted data representing interactions of the member with items presented in the news feed during the random session.

20. A machine-readable non-transitory storage medium having instruction data executable by a machine to cause the machine to perform operations comprising:
   detecting, at a server system, a request to commence a login session for a member represented by a member profile in an on-line social network system;
   generating randomly with a predetermined probability, a session mode value;
   invoking a relevance model to generate respective scores for items in an inventory of updates identified as potentially of interest to the member, the respective relevance scores utilized to determine ordering of updates from the inventory of updates on a news feed web page generated for the member;
   randomizing the order of presentation of items to be included in the news feed web page based on the generated session mode value indicating that the requested login session is to be a random session, the news feed page to be displayed on a display device of the member; and
   training the relevance model using data representing interactions of the member with items presented in the news feed during the random session.

* * * * *

UNITED STATES PATENT AND TRADEMARK OFFICE
CERTIFICATE OF CORRECTION

PATENT NO. : 10,187,493 B1
APPLICATION NO. : 15/188650
DATED : January 22, 2019
INVENTOR(S) : Lytkin et al.

Page 1 of 1

It is certified that error appears in the above-identified patent and that said Letters Patent is hereby corrected as shown below:

In the Claims

In Column 9, Line 57, in Claim 5, delete "profile;" and insert --profile,-- therefor In Column 10, Line 3, in Claim 9, delete "teed" and insert --feed-- therefor In Column 11, Line 9, in Claim 20, after "generating", insert --,--

Signed and Sealed this
Seventeenth Day of March, 2020

Andrei Iancu
*Director of the United States Patent and Trademark Office*